3,590,044
PROCESS FOR THE PREPARATION OF 1,2,3,4-TETRAHYDROISOQUINOLINE-2-CARBOXAMIDINES
Charles William Den Hollander, Midland Park, N.J., assignor to Hoffmann-La Roche Inc., Nutley, N.J.
No Drawing. Filed Aug. 19, 1966, Ser. No. 573,485
Int. Cl. C07d 33/50
U.S. Cl. 260—288    6 Claims

ABSTRACT OF THE DISCLOSURE 1,2,3,4-tetrahydro-isoquinolin-2-carboxamidines of the formula

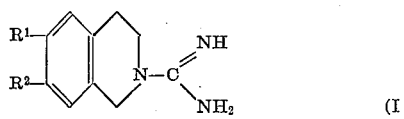

wherein $R^1$ and $R^2$, individually, are hydrogen, hydroxyl and lower alkoxy, and together, are alkylenedioxy, are prepared from the corresponding 1,2,3,4-tetrahydroisoquinoline by treatment with cyanamide in an aqueous alcoholic medium at a controlled pH. The end products are useful as hypotensive agents.

---

This invention is concerned with an improved process for producing 1,2,3,4-tetrahydroisoquinoline-2 - carboxamidines and acid addition salts thereof. More particularly, this invention is concerned with an improved process for reacting a tetrahydroisoquinoline in the form of an acid addition salt with cyanamide to produce an acid addition salt of 1,2,3,4-tetrahydroisoquinoline-2-carboxamidine.

Recently, a novel class of 1,2,3,4-tetrahydroisoquinoline-2-carboxamidines was discovered, the members of which have value as pharmaceuticals due to their outstanding hypotensive activities. These compounds are represented by the formula:

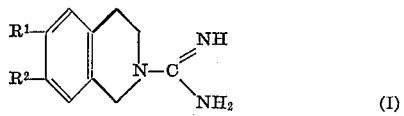

wherein $R^1$ and $R^2$, when taken individually, are hydrogen, hydroxyl, or lower alkoxy; and $R^1$ and $R^2$, when taken together, are alkylenedioxy.

These products have been synthesized by a number of syntheses from the corresponding tetrahydroisoquinolines of the formula:

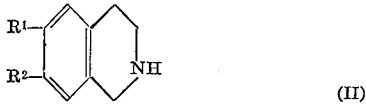

wherein $R^1$ and $R^2$ are as defined above.

However, to date, no commercially attractive synthesis has been devised. Of all the guanylating agents, such as 2-alkyl-2-isothioureas, 2-alkyl-2-pseudoureas, 3,5-dialkyl-pyranol-1-carboxamidines, and the like, cyanamide would appear to be the most desirable from the standpoint of simplicity of reaction and cost, it being commercially available very inexpensively in the form of an aqueous solution. However, the direct use of the aqueous cyanamide was believed precluded by the relatively low yields of guanidines encountered when cyanamide is reacted with a primary or secondary aliphatic amine in water. Although cyanamide is commercially available in an anhydrous form, its cost is roughly 20 times that of the aqueous form. Furthermore, dehydration of aqueous cyanamide solutions is a hazardous operation, which should not be attempted on a plant scale.

It has been unexpectedly and surprisingly discovered that carboxamidines for Formula I are economically produced in high yields from the reaction of cyanamide with a tetrahydroisoquinoline of Formula II when the reaction is conducted in an aqueous alcoholic medium. This result is particularly surprising in view of published reports that alcohols, like water, generally reduce the yield of guanidines from the reaction of cyanamide with aliphatic amines. Nevertheless, by proceeding in accordance with this invention, one can produce the compounds of Formula I in yields of up to about 90 percent or more from the compounds of Formula II by guanylation with the inexpensive aqueous cyanamide of commerce.

The alcohols which are employed in accordance with this invention are preferably lower alkanols, i.e., alkanols of from 1 to 6 carbons, with alkanols which are completely miscible with water in all proportions, such as methanol, ethanol, isopropanol, n-propanol, and tert.-butanol,, being especially preferred. Methanol is most preferred. The amount of water in the aqueous alcohol reaction medium can comprise from about 2 to about 30 volume percent, with amounts of from about 5 to about 20 percent being preferred.

The tetrahydroisoquinoline is employed in the reaction at least in part in the form of its acid addition salt with a strong acid, preferably a strong pharmaceutically acceptable acid. Suitable strong acids include inorganic acids such as sulfuric acid, hydrochloric acid, hydrobromic acid, hydriodic acid, nitric acid, phosphoric acid, and the like, and organic acids such as alkyl- and arylsulfonic acids containing up to about 10 carbons, such as ethylsulfonic acid, benzenesulfonic acid, toluenesulfonic acid, and the like. Preferred are acid addition salts of sulfuric acid.

To achieve good yields of the desired carboxamidine, it is preferred that the reaction be effected at a basic pH, i.e., at a pH greater than about 7. Thus, it is preferred that not all of tetrahydroisoquinoline (II) is neutralized by formation of an acid addition salt. The initial pH of the reaction mixture is preferably in the range of from about 7.2 to about 9, with an initial pH in the range of from about 7.9 to about 8.5 being preferred. Higher initial pH's may be employed if desired, although when excess cyanamide is employed in the reaction, the pH of the reaction mixture increases due to the reduction of the cyanamide; on the other hand, a pH of 7 or below results in a substantial reduction of yield of the carboxamidine.

The method of addition of the reactants is not critical to the process of this invention. It is preferred, however, to add an aqueous cyanamide solution to a solution of the desired tetrahydroisoquinoline acid addition salt in the selected alcohol reaction medium. It is preferred, although not essential, that the pH of both solutions prior to their admixing be at the desired initial pH for the reaction. Obviously, however, this is not essential provided that the pH of the mixture of these two solutions falls within the above-recited initial pH ranges for the reaction itself. Alternatively, the desired initial pH can be obtained by the addition of acid or base to the reaction mixture before initiating the reaction.

The reaction temperature is not narrowly critical to this invention, although elevated temperatures, preferably above about 60° C., are generally preferred to achieve good yields in a reasonable period of time. Temperatures in the range of from about 70 to about 90° C. are especially preferred.

The molar ratio of cyanamide to tetrahydroisoquinoline (II) is not critical to this invention, although a molar excess of cyanamide is preferred. A molar ratio in the range of from about 1.1:1 to about 1.5:1 has been found generally suitable.

The following examples are illustrative.

EXAMPLE 1

A 250-milliliter, round-bottomed, 3-necked flask, equipped with thermometer, agitator, and reflux condenser, was charged with 26.0 grams (0.192 mol) of tetrahydroisoquinoline* and 75.0 milliliters of methanol. After cooling the solution to 20° C., there was added slowly 9.1 grams (0.093 mol) of concentrated sulfuric acid, while maintaining the temperature between 35 and 40° C. by external cooling, to adjust the pH of the solution to 8.0 to 8.1. Thereafter 20 milliliters of a 50 percent aqueous cyanamide solution (0.251 mol of cyanamide), the pH of which had been adjusted to 8.0 to 8.1 with concentrated ammonium hydroxide, was added at once to the tetrahydroisoquinoline sulfate solution. The addition was accompanied by a slight temperature increase of about 5 to 10° C. The resulting reaction mixture, which had a pH of 8.0 to 8.1, was then heated at reflux temperature (72–73° C.) for 10 hours. After about 2 hours at reflux, fine white crystals of 1,2,3,4-tetrahydroisoquinoline-2-carboxamidine sulfate began to separate. After 10 hours at reflux the reaction mixture was coole dto 25° C. The pH of the reaction mixture, which had increased to 10.8 to 11.0, was adjusted with concentrated sulfuric acid to a pH of 65. The reaction mixture was then cooled to 5° C. in an ice bath and the crystalline tetrahydroisoquinolinecarboxamidine sulfate was filtered off. After washing the product with three 20-milliliter portions of methanol at 5° C., the crude product was dried under vacuum at 100° C. to constant weight. There was obtained 39.9 grams of 1,2,3,4-tetrahydroisoquinoline-2-carboxamidine, melting point 271–273° C. (uncorr.) representing a yield of 93.5 percent.

Analysis.—Calculated for $C_{20}H_{28}N_6O_4S$ (percent): C, 53.6; H, 6.3; N, 18.7. Found (percent): C, 53.5; H, 6.3; N, 18.3.

The thus-obtained product was dissolved in 120 milliliters of boiling water and the resulting solution was cooled with stirring to 5° C. The crystals which had formed were filtered off and washed three times with 25-milliliter portions of ice water. After drying under vacuum at 100° C. to constant weight, there was obtained 37.5 grams of pure product (melting point 271–273° C. [uncorr.]), representing a yield of 87 percent.

EXAMPLE 2

Employing apparatus and procedures similar to those described in Example 1, except that 42.5 grams of a crude tetrahydroisoquinoline containing 59.8 percent tetrahydroisoquinoline, 23.9 percent ethanol, 14.9 percent isoquinoline, and 1.4 percent quinoline, was substituted for the 98 percent tetrahydroisoquinoline. There was obtained 41.3 grams of crude 1,2,3,4-tetrahydroisoquinoline-2-carboxamidine sulfate, melting point 269–273° C., representing a 96.2 percent crude yield. On recrystallization there was obtained 37.3 grams of pure product (melting point 271–273° C.), representing a yield of 87.1 percent.

I claim:

1. In a process for producing a 1,2,3,4-tetrahydroisoquinoline-2-carboxamidine of the formula:

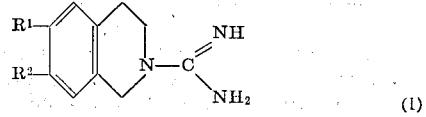

(1)

by the reaction of a tetrahydroisoquinoline of the formula:

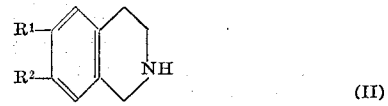

(II)

wherein in the above formulae $R^1$ and $R^2$, when taken individually, are selected from the group consisting of hydrogen, hydroxyl, and lower alkoxy; and $R^1$ and $R^2$, when taken together, are alkylenedioxy with cyanamide, the improvement which comprises effecting said reaction with the tetrahydroisoquinoline in part in the form of its acid addition salt in an aqueous alcoholic reaction medium comprising a lower alkanol of 1–4 carbon atoms and from about 2 to about 30 percent water based upon the combined water-alcohol volume at a pH in the range of 7.2–9.

2. The process as claimed in claim 1 wherein the initial pH of the reaction mixture is in the range of from about 7.9 to about 8.5.

3. The process as claimed in claim 2 wherein said alkanol is methanol.

4. The process as claimed in claim 2 wherein said alkanol is ethanol.

5. The process as claimed in claim 1 wherein the aqueous alcoholic reaction medium contains from about 5 to about 20 percent water based on the combined water-alcohol volume.

6. The process as claimed in claim 5 wherein the initial pH of the reaction mixture is in the range of from about 7.9 to about 8.5.

References Cited

UNITED STATES PATENTS

| | | | |
|---|---|---|---|
| 2,951,843 | 9/1960 | Haakk | 260—288 |
| 3,314,963 | 4/1967 | Koch | 260—288 |
| 3,056,789 | 10/1962 | Urech | 260—286 |
| 3,098,066 | 7/1963 | Mull | 260—268X |
| 3,291,799 | 12/1966 | Wenner | 260—288X |

DONALD G. DAUS, Primary Examiner

U.S. Cl. X.R.

260—286, 564A